(12) United States Patent
MacFarlane

(10) Patent No.: US 6,697,645 B1
(45) Date of Patent: Feb. 24, 2004

(54) PHONE WITH AMBIENT TEMPERATURE SENSOR AND DISPLAY

(75) Inventor: Jeanine Marie MacFarlane, Lithonia, GA (US)

(73) Assignee: Motorola, Inc., Schaumburg, IL (US)

( * ) Notice: Subject to any disclaimer, the term of this patent is extended or adjusted under 35 U.S.C. 154(b) by 389 days.

(21) Appl. No.: 09/640,634

(22) Filed: Aug. 17, 2000

(51) Int. Cl.⁷ .............................. H04B 1/38; H04M 1/00
(52) U.S. Cl. .................. 455/566; 455/572; 455/66; 429/90; 429/94; 429/98; 320/150
(58) Field of Search ................................ 455/566, 572, 455/343, 66; 429/90, 92–94, 62, 98, 120; 320/150–154; 324/431, 374

(56) References Cited

U.S. PATENT DOCUMENTS

| | | | | |
|---|---|---|---|---|
| 5,159,315 A | * | 10/1992 | Schultz et al. | 340/539 |
| 5,481,506 A | * | 1/1996 | Kita | 368/10 |
| 5,603,101 A | * | 2/1997 | Choi | 455/566 |
| 5,703,470 A | * | 12/1997 | Baranowski et al. | 320/152 |
| 5,912,547 A | * | 6/1999 | Grabon | 320/150 |
| 6,040,683 A | * | 3/2000 | Mottier | 320/137 |
| 6,072,396 A | * | 6/2000 | Gaukel | 340/573.4 |
| 6,100,672 A | * | 8/2000 | Siponen | 320/150 |
| 6,152,597 A | * | 11/2000 | Potega | 374/185 |
| 6,169,884 B1 | * | 1/2001 | Funk | 455/67.1 |
| 6,181,103 B1 | * | 1/2001 | Chen | 320/106 |
| 6,215,274 B1 | * | 4/2001 | Dotzler | 320/106 |
| 6,373,228 B1 | * | 4/2002 | Sakakibara | 320/150 |
| 6,475,662 B1 | * | 11/2002 | Spencer | 429/112 |

* cited by examiner

Primary Examiner—William Trost
Assistant Examiner—Sharad Rampuria
(74) Attorney, Agent, or Firm—Philip H. Burrus, IV

(57) ABSTRACT

This invention includes a battery pack having an environmental sensor. The battery pack can be coupled to an electronic communications device like a cellular telephone. The battery pack transmits an electronic signal corresponding to the environmental conditions through mating contacts to the electronic communications device so that it may display the information to a user. Alternatively, the display screen can be integrated into the battery pack such that the battery pack itself is an environmental sensor. The types of environmental sensors that may be used include ambient temperature, humidity, barometric pressure, smoke detectors, and pollen detectors. This invention also includes a system for measuring the ambient temperature with an electronic communication device that is an improvement over U.S. Pat. No. 5,603,101, in that the temperature sensor is disposed in the battery pack where the rechargeable cell can serve as an insulator from the heat generated by the electronic host device.

18 Claims, 2 Drawing Sheets

PHONE WITH AMBIENT TEMPERATURE SENSOR AND DISPLAY

TECHNICAL FIELD

This application relates generally to portable electronic communications devices and, more specifically, to cellular telephones with data acquisition capabilities.

BACKGROUND

Modern automobiles come with many amenities. One of the most popular options in come cars is an inside/outside thermometer. For example, high-end BMW automobiles are equipped with a dual thermometer that reads the temperature both inside the vehicle as well as the ambient outside temperature. The inside temperature can be used to set the climate control system. With a touch of a button, the driver can see either the outside temperature or the inside temperature. A quick comparison reminds the driver how lucky he is to have such a fancy car.

The popularity of this feature is due in part to the innate desire to know the temperature. On any given summer's day in Atlanta, Ga., where it gets really hot, you are bound to hear people talking about the heat. One might say, "Man, it sure is hot out here! It's a hundred and five if it's a degree!" In response, another might say, "I'll bet that it's not more than a hundred and two." After this, friendly wagering is likely to ensue.

There are a couple of ways to settle this argument. The first is to listen to the radio for the temperature. The problem with this solution is that mainstream radio stations only announce the temperature once or twice an hour. Consequently, our friends may have to bear the heat and risk their health for thirty minutes or more to find out the temperature.

The other solution is to look at a thermometer. The problem with this solution is that most outdoor thermometers are big and bulky, and not conducive to being carried in a pocket. There is thus a need for an improved temperature measurement system.

DETAILED DESCRIPTION OF THE INVENTION

Figure 1:
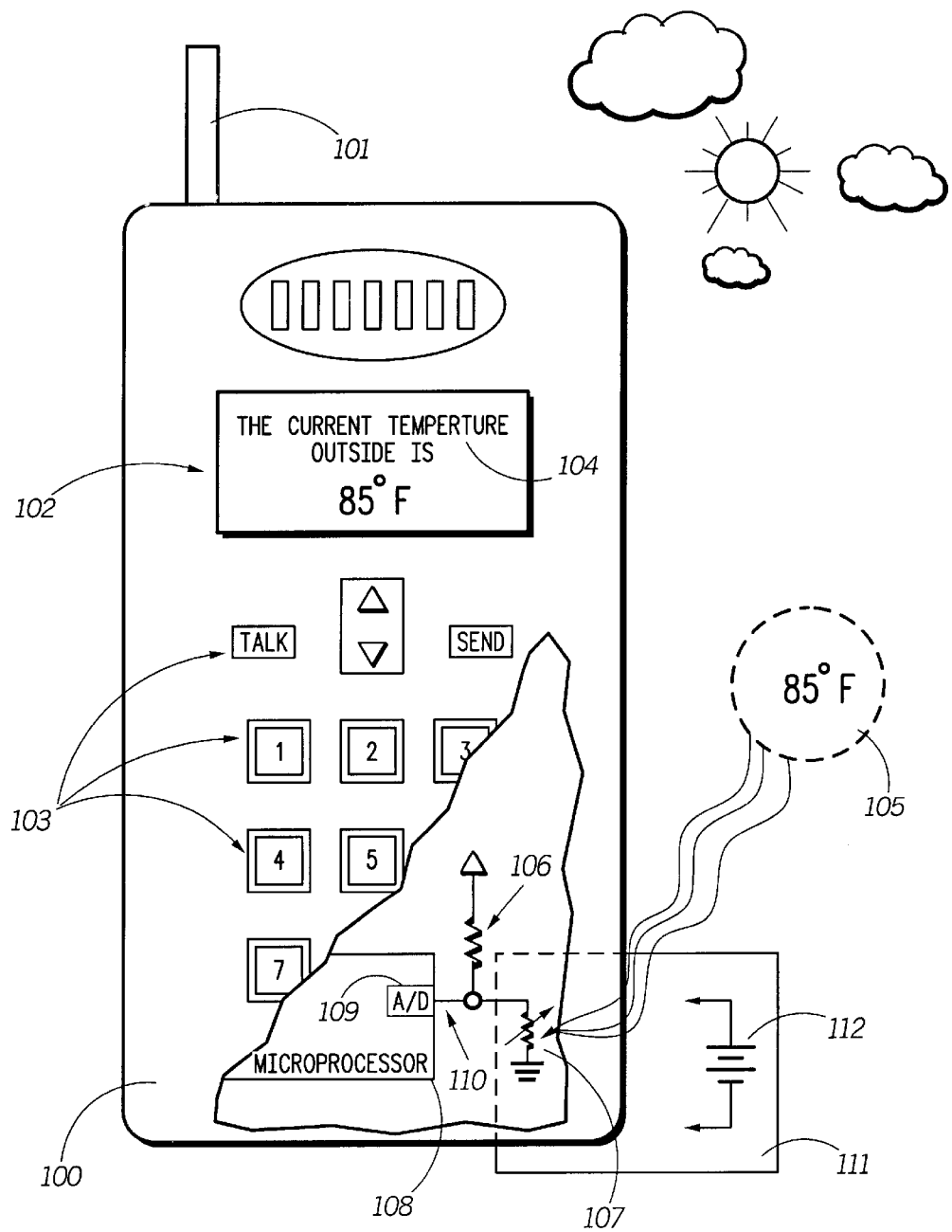
FIG. 1 illustrates a telephone for measuring temperature in accordance with the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

This invention includes a portable electronic device having a detachable battery cell with a means for measuring ambient temperature. The temperature sensor is coupled to the device through mating contacts on the phone and battery. The temperature is then displayed on an indicator. In one embodiment, the device may be a cellular telephone. The user may hit one or more query keys causing the phone to take a temperature reading and display it on the screen. For example, a person might press the "menu" button followed by the "1" key, which causes the phone to measure the temperature and display it on the screen. In another embodiment, the ambient temperature may be measured and displayed continuously when the phone is not in use.

Referring now to FIG. 1, illustrated therein is a phone 100 having an antenna 101 for transmitting and receiving data and an indicator display 102. The indicator display 102 may be a liquid crystal display (LCD), light emitting diode (LED) display, audible enunciator or other type of display. The phone 100 includes buttons 103 for actuating the device. The phone 100 includes a microprocessor 108 for running the embedded software associated with cellular phones.

U.S. Pat. No. 5,603,101, entitled "Method of and apparatus for displaying temperature on a radio telephone", issued to Choi, incorporated herein by reference for all purposes, teaches such a device. (This invention is an improvement upon that patent as the temperature sensor resides in a detachable battery pack.) This improvement has many advantages over Choi. First, different types of temperature sensors may be attached to the phone by using different batteries. For example, American users may want to use a Fahrenheit sensor, while European users may want a centigrade sensor. As Choi discloses a phone having a temperature sensor built therein, the user would have to replace the phone to get an alternate sensor. With this invention, the user must only change the battery. Additionally, a traveling user may take multiple batteries that can be interchanged at any time to give the preferred temperature reading.

Next, to be accurate, the temperature sensor must be calibrated. Calibration requires time, specialized equipment and labor, all of which add cost. With the Choi invention, the phone must be calibrated, resulting in a more expensive phone. If the user wants the temperature feature, this is acceptable. If, however, the user does not want a temperature sensor, he will not be willing to pay extra for a calibrated phone. Thus, the phone manufacturer must maintain two different product offerings which adds additional cost. The present invention, allows users to upgrade their phone at any time, paying the extra cost for a temperature sensor battery only when the feature is desired. As batteries typically are manufactured with an electronically erasable programmable read only memory (EEPROM), the calibration data could be stored in the battery EEPROM and downloaded to the phone.

Third, the present invention allows different types of sensors to be attached without reconfiguring the phone. For example, a user might have a humidity sensor battery, a smoke detector battery, a temperature sensor battery, a barometric pressure sensor battery, and a pollen counter battery. These are all interchangeable, allowing the user to configure the phone on the fly. Choi, by contrast, is limited to a single configuration.

Fourth, the battery is generally coupled to the outside of the phone. This invention allows the temperature sensing means to be coupled more closely to the outside environment. Choi, by contrast, has the temperature sensor disposed within the phone, with electronic circuitry and power amplifiers that dissipate heat. This heat dissipation can cause erroneous temperature measurements. The present invention, on the other hand, allows the battery to insulate the temperature sensor from the power circuitry.

Referring again to FIG. 1, in one embodiment, the phone has a detachable, rechargeable battery pack 111 having temperature sensing circuitry comprising a thermistor 107. The phone 100 has a corresponding and a pull-up resistor 106. The pull-up resistor 106 and the thermistor 107 are coupled in a resistor divider network through mating contacts on the battery and phone, with the midpoint 110 connected to an analog to digital (A/D) converter 109 on-board the microprocessor 108. When the thermistor is exposed to the outside temperature 105, the impedance of the thermistor 107 changes in a linear fashion. The change in impedance causes the voltage at the midpoint of the divider 110 to change. The value of the voltage at the midpoint of the divider 110 is proportional to the ambient temperature 105.

The A/D 109 converts the voltage at the midpoint of the voltage divider 110 into digital data, which is sent to the microprocessor 108. The microprocessor then multiplies the digital data by a constant to convert it to degrees. The type of sensor determines the appropriate temperature scale: degrees Fahrenheit, degrees centigrade, or degrees Kelvin. The scaled data is then displayed on the indicator display 105 with an appropriate message 104. For example, an appropriate message may read, "The current ambient temperature is 85° F."

Figure 2:
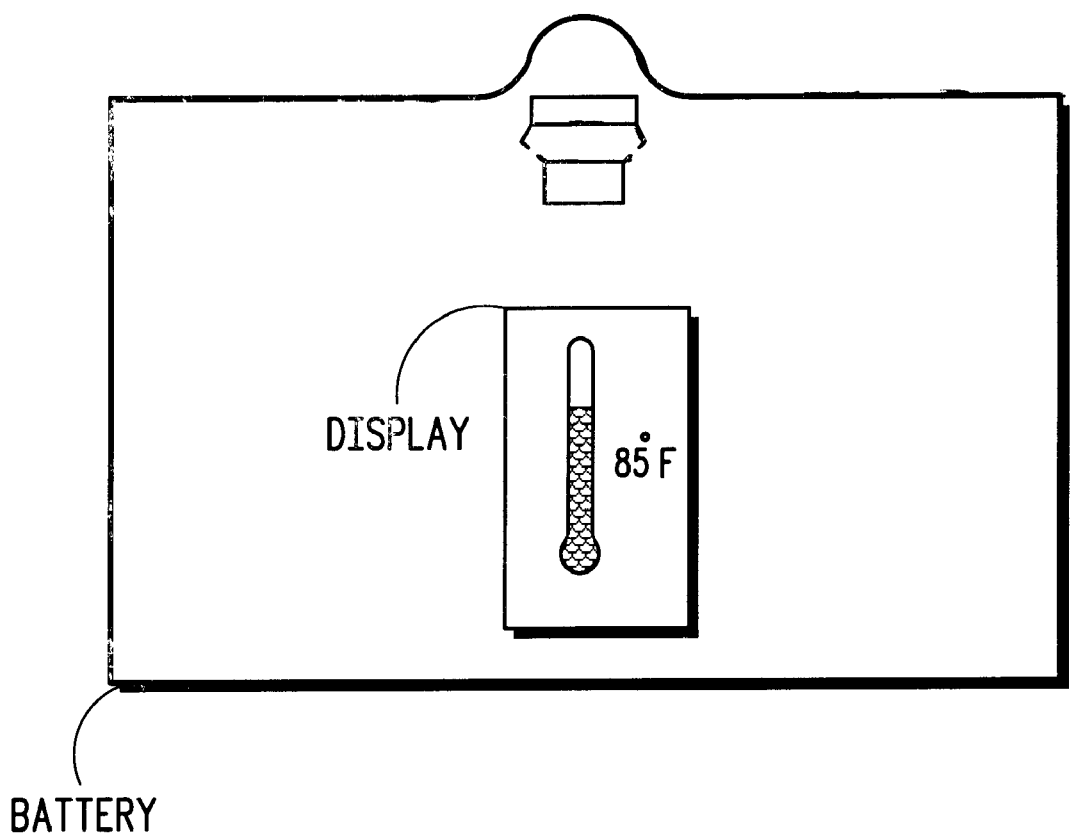
FIG. 2 illustrates an exemplary temperature display in accordance with the invention.

Alternatively, the display may be located on the battery as a separate indicator. Additionally, as opposed to displaying a message, the temperature indication could be graphical, for example in the form of a thermometer, as shown in FIG. 2.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while the invention has been described as employing a microprocessor in a host device, the sensor circuitry could be self-contained in the battery. In such a case, the sensor circuitry could employ a microprocessor, or could be simple analog circuitry to save cost.

What is claimed is:

1. A system for displaying temperature, the system comprising:
   a. an electronic communications device having mating contacts;
   b. an indicator display; and
   c. a detachable battery pack having an ambient temperature sensing means, the sensing means being disposed adjacent to an exterior portion of the detachable battery pack, and corresponding mating contacts; and
   d. at least one pull-up resistor disposed within the electronic communications device.

2. The system of claim 1, wherein the detachable battery pack further comprises a memory storing calibration data.

3. The system of claim 2, wherein the indicator display is disposed on the battery.

4. The system of claim 3, wherein the indicator display enunciates a text message and a reading of the ambient temperature.

5. The system of claim 3, wherein the indicator display comprises a graphical representation of temperature.

6. The system of claim 5, wherein the graphical representation of temperature is a picture resembling a conventional thermometer with a virtual mercury level proportional to the ambient temperature.

7. The system of claim 4 or 5, wherein the measurement of temperature is measured on a scale selected from the group consisting of degrees Fahrenheit, degrees centigrade and degrees Kelvin.

8. The system of claim 7, wherein the detachable battery pack further comprises at least one rechargeable battery cell that serves as a thermal insulator between the temperature sensing means and the electronic communications device.

9. A detachable battery pack for an electronic host device, comprising:
   a. at least one rechargeable battery cell;
   b. at least one environmental sensor for sensing conditions external to the battery pack, the at least one environmental sensor being disposed adjacent to an exterior of the detachable battery pack; and
   c. at least three mating contacts; wherein one of the at least three mating contacts is for transmitting an electrical signal correlating to the environmental sensor.

10. The battery pack of claim 9, wherein the environmental sensor is selected from the group consisting of temperature sensors, barometric pressure sensors, pollen sensors, and humidity sensors.

11. The battery pack of claim 10, further comprising a memory storing calibration data.

12. The battery pack of claim 11, further comprising an indicator display wherein the indicator display enunciates a text message and a reading of the conditions external to the battery pack.

13. The battery pack of claim 11, further comprising an indicator display wherein the indicator display comprises a graphical representation of conditions external to the battery pack.

14. The battery pack of claim 13, wherein the graphical representation of temperature is a picture resembling a conventional thermometer with a virtual mercury level proportional to the ambient temperature.

15. The battery pack of claim 12 or 13, wherein the measurement of temperature is measured on a scale selected from the group consisting of degrees Fahrenheit, degrees centigrade and degrees Kelvin.

16. An improved apparatus for displaying temperature on a radio telephone having a memory, liquid crystal display, a keypad, an analog/digital converting means, a microcomputer, and a means for measuring current room or environment temperature, wherein the improvement comprises the means for measuring current room or environment temperature being disposed in a detachable rechargeable battery pack towards an exterior portion of the battery pack.

17. The apparatus of claim 16, wherein the measurement of temperature is measured on a scale selected from the group consisting of degrees Fahrenheit, degrees centigrade and degrees Kelvin.

18. The apparatus of claim 17, wherein the rechargeable battery pack comprises at least one rechargeable battery cell that serves as a thermal insulator between the temperature sensing means and the electronic communications device.

* * * * *